US010442259B2

(12) United States Patent
Park et al.

(10) Patent No.: US 10,442,259 B2
(45) Date of Patent: Oct. 15, 2019

(54) TIRE WITH SELF-INFLATION DEVICE

(71) Applicant: KUMHO TIRE CO., INC., Gwangju (KR)

(72) Inventors: Seong Jong Park, Anyang-si (KR); Sang Do Na, Yongin-si (KR); Hyoung Seok Kim, Busan (KR); In Chul Sung, Hwaseong-si (KR)

(73) Assignee: KUMHO TIRE CO., INC., Gwangju (KR)

( * ) Notice: Subject to any disclaimer, the term of this patent is extended or adjusted under 35 U.S.C. 154(b) by 371 days.

(21) Appl. No.: 15/459,411

(22) Filed: Mar. 15, 2017

(65) Prior Publication Data

US 2018/0178602 A1 Jun. 28, 2018

(30) Foreign Application Priority Data

Dec. 23, 2016 (KR) .................. 10-2016-0178250

(51) Int. Cl.
*B60C 23/12* (2006.01)
*F04B 37/10* (2006.01)
*F04B 39/00* (2006.01)
*F04B 39/10* (2006.01)

(52) U.S. Cl.
CPC ............ *B60C 23/12* (2013.01); *F04B 37/10* (2013.01); *F04B 39/0005* (2013.01); *F04B 39/10* (2013.01)

(58) Field of Classification Search
CPC ...... B60C 23/12; F04B 37/10; F04B 39/0005; F04B 39/10
See application file for complete search history.

(56) References Cited

U.S. PATENT DOCUMENTS

| 8,042,586 | B2 | 10/2011 | Losey et al. |
| 8,113,254 | B2 | 2/2012 | Benedict |
| 8,573,270 | B2 | 11/2013 | Hinque |
| 9,205,714 | B2 | 12/2015 | Hinque |
| 9,216,620 | B2 * | 12/2015 | Lamgaday ............. B60C 23/12 |
| 9,415,640 | B2 * | 8/2016 | Lin ........................ B60C 23/12 |
| 9,744,816 | B2 * | 8/2017 | Lin ...................... B60C 23/004 |
| 9,783,015 | B2 * | 10/2017 | Lin ........................ B60C 23/12 |

(Continued)

FOREIGN PATENT DOCUMENTS

| EP | 1648721 | 11/2006 |
| EP | 2565059 | 3/2013 |
| EP | 2565061 | 3/2013 |
| EP | 2853420 | 4/2015 |
| JP | 2013049410 | 3/2013 |

(Continued)

OTHER PUBLICATIONS

Japanese Office Action—Japanese Application No. 2017-063472 dated May 29, 2018, citing JP 2015-89812.

(Continued)

*Primary Examiner* — Kip T Kotter
(74) *Attorney, Agent, or Firm* — Cantor Colburn LLP (57) ABSTRACT

Provided is a tire with self-inflation device. The tube is inserted inside the side portion where the extension and contraction movements of the tire are mostly occurring in order to further enhance the efficiency of the air supply to the tire cavity during driving. The air compressed towards the driving direction is injected to the tire cavity, and the air from the outside is charged to the tube due to the negative pressure formed in the tube located in the opposite side of driving. The durability is enhanced by reducing the exposed portion of the regulator.

9 Claims, 9 Drawing Sheets

(56) References Cited

U.S. PATENT DOCUMENTS

| | | | |
|---|---|---|---|
| 2013/0048176 A1* | 2/2013 | Hinque | B60C 23/12 152/450 |
| 2014/0000778 A1* | 1/2014 | Gobinath | B60C 23/12 152/450 |
| 2014/0020805 A1* | 1/2014 | Gobinath | B60C 23/12 152/450 |
| 2015/0041036 A1* | 2/2015 | Lin | B60C 23/12 152/450 |
| 2015/0090386 A1* | 4/2015 | Lin | B60C 23/12 152/450 |
| 2015/0158348 A1* | 6/2015 | Hinque | B60C 23/12 92/61 |
| 2016/0046157 A1* | 2/2016 | Lin | B60C 23/12 152/450 |
| 2016/0046159 A1* | 2/2016 | Lin | B60C 23/12 152/450 |

FOREIGN PATENT DOCUMENTS

| | | |
|---|---|---|
| JP | 2013079067 | 5/2013 |
| JP | 2015089812 | 5/2015 |
| JP | 2016040164 | 3/2016 |
| JP | 5937462 | 6/2016 |

OTHER PUBLICATIONS

Korean Office Action—Korean Application No. 10-2016-0178250 dated Dec. 12, 2017, citing JP 2013-049410, JP 2016-040164 and JP 5937462.

European Search Report—European Application No. 17161952.1, dated Oct. 13, 2017, citing EP 2 565 061, EP 2 565 059 and EP 2 853 420.

Japanese Office Action—Japanese Application No. 2017-063472 dated Sep. 11, 2018, citing JP 2015-089812 and JP 2013-079067.

* cited by examiner

| TUBE MATERIAL | INSERTED INTO THE BEAD PORTION | INSERTED INTO THE SIDE PORTION |
|---|---|---|
| SILICON | 0.2psi/h | 1psi/h |
| EPDM | 0.5psi/h | 3psi/h |

TIRE WITH SELF-INFLATION DEVICE

CROSS-REFERENCE TO RELATED PATENT APPLICATION

This U.S. non-provisional patent application claims priority under 35 U.S.C. § 119 of Korean Patent Application No. 10-2016-0178250 filed on Dec. 23, 2016 in the Korean Patent Office, the entire contents of which are hereby incorporated by reference.

TECHNICAL FIELD

The present invention relates to a tire capable of self-maintaining a proper air pressure by supplementing the leaking air pressure during tire operation through the air compression reaction induced by extension and contraction of the tube connected to the regulator.

BACKGROUND

Generally a minute portion of the air confined in the assembly of the tire and the rim is naturally leaking out as the time elapses.

When the air pressure of a tire is lower than the proper air pressure, steering, braking, and driving performance of a vehicle will be degraded.

In order to maintain the preset air pressure of a tire, the tire pressure detection system of the prior art measures the pressure or the temperature inside the tire using the tire pressure detection sensor mounted in the wheel and transmits this information to the control unit via the wireless communication.

However, the tire pressure detection system of the prior art simply alarm the driver when the tire pressure drops below the predetermined pressure, therefore, there has been a problem that still there is a risk of driving accident during driving to a vehicle service station, and intervening of the driver is necessary.

Further progressed from tire pressure monitoring system (TPMS), the necessity of development of an active tire safety device not requiring involvement of a driver when the tire pressure is decreased has been suggested.

Followings are the descriptions about a prior art related to tires capable of self-maintaining air pressure thereof.

(1) First, European Patent No. 1648721 (hereinafter refer to as 'Prior Art 1') is characterized in that a tube is installed between the tire and a rim flange 1a, and a valve and a filter are installed at the both ends of the tube.

Generally, the tube supplying air into the tire is made of a flexible material such as a rubber which is a softer material compared to the rim flange 1a made of a metallic material.

Thus, a problem exists in Prior Art 1 that the durability of the tube can be degraded as the tube is being contacted to the rim flange 1a continuously.

In addition, since the bead portion which is in the vicinity of the rim flange is unlikely to be deformed, there is a disadvantage that the compression and expansion of the tube supplying air into the tire are not performed smoothly.

However, compression of the tube may occur through the contact with the wheel, that is the rim flange, but in this case, disadvantages have been suggested that the durability of the tube is degraded including the problem as described above.

(2) U.S. Pat. No. 8,042,586 (hereinafter refer to as 'Prior Art 2') is characterized in that the bending region within a rolling tire footprint having a neutral axis, a compression sidewall, and an elongation sidewall, and a groove wherein the tube is installed is positioned within the compression sidewall, and a tube is positioned within the tube in contacting engagement with opposite groove surface.

Especially, in the case of Prior Art 2, it has been exemplary shown that the positions of the tube in the compression sidewall, wherein the compression of the tube is occurring during the rolling of the tire, are 200 in the outer surface, 202 in the inner surface, and 204 in the outer surface in FIG. 9B of Prior Art 2.

Prior Art 2 is characterized by suggesting a technology wherein the air is forced by the compression of the tube during the rolling of the tire.

However, actually the movement of a tire is accomplished by the up-down movement of folding and unfolding thereof due to the compression at the surface of contact with the road surface, that is, an active extension and contraction movement.

Therefore, it is desirable to position the tube in a place where the most active extension and contraction movement is occurring in order to inject the air into the tire cavity.

In addition, the device for maintaining a proper air pressure of a tire should be made to be as light as possible, since the weight of a vehicle is closely related to the vehicle's performance.

(3) In U.S. Pat. No. 8,113,254 (hereinafter refer to as 'Prior Art 3'), a circular type air tube is connected to the inlet and outlet devices which have the shape of a letter "T."

It is characterized in that the inlet and outlet devices are positioned facing each other.

In the case of Prior Art 3, there are disadvantages as follows.

First, the inlet and the outlet are facing each other with 180 degree symmetry, that is, only half of the total length of the tube is used, therefore the performance is relatively lower when compared to the method having the inlet and outlet devices located in same position, and moreover, there is a difficulty in installing when compared to the technology comprising only one device for installing.

Besides, the external air is constantly introduced into the tube since no regulator is formed in the inlet device, and the process of exhausting the air via the outlet device is repeatedly performed even at the preset air pressure.

Therefore, since the inlet and outlet devices of the tire must be operating continuously during the operation of the tire, this may cause a big problem of degradation in the durability of the inlet and outlet devices.

Moreover, there is a disadvantage that the manufacturing and setting method for the valve comprising the combination of two balls and respective springs is difficult when compared to the piston method having one spring.

U.S. Pat. No. 9,205,714 (hereinafter refer to as 'Prior Art 4') has an advantageous structure capable of minimizing the height using a regulator utilizing the thin layer of a membrane method.

However, in the case of Prior Art 4, it not only uses two check valves in order to prevent reverse flow of the air, but also uses a separate spring for the design of the regulator considering the high pressure of the tire, therefore, the structure becomes rather complicated and there is a difficulty in miniaturization thereof.

And, a fine adjustment for setting the preset tire pressure becomes impossible.

Moreover, disadvantages have been suggested that since the connection between the compression tube and the inlet and outlet port is accomplished inside the bead portion of the tire, it is too difficult to apply to the actual tire.

In U.S. Pat. No. 8,573,270 (hereinafter refer to as 'Prior Art 5'), the introduction of the air is controlled by the disc-like pressure membrane made of a flexible material, and it is about a technology for miniaturization of the valve (or regulator).

Although the objective of miniaturization of the valve (or regulator) can be partially achieved by Prior Art 5, the pressure membrane is continuously receiving the centrifugal force along the radial direction when the tire is rotating.

Therefore, while there is an advantage of miniaturization of the valve (or regulator), the problem of degradation in the durability of the pressure membrane has been suggested.

PATENT DOCUMENTS

1. European Patent No. 1,648,721
2. U.S. Pat. No. 8,042,586
3. U.S. Pat. No. 8,113,254
4. U.S. Pat. No. 9,205,714
5. U.S. Pat. No. 8,573,270

SUMMARY

The objective of the present invention devised for solving the above described problems of the prior art is to provide a tire capable of maintaining air pressure thereof so that not only the further miniaturization of regulator becomes possible but also the efficiency of supplying air to the tire cavity can be further enhanced.

The present invention for solving the above described problem is characterized in that and comprising: a tire including a side portion; a tube disposed in the outer side of the side portion; and a regulator connected to the tube, wherein the regulator comprises: a main body having a space for accommodating a piston therein; a first port formed in the upper side of the main body, communicating with the external air; a second port located at the one side of the main body; a third port located at the other side of the main body; and a fourth port communicating with the third port, formed in the lower side of the main body, and wherein one end of the tube is connected to the second port, and the other end of the tube is connected to the third port, and the fourth port is penetrating through the side portion and being communicated with the tire cavity.

The present invention is characterized in that the piston moves back-and-forth along the circumferential direction of the tire.

The present invention is characterized in that a check valve interposed between the first port and the piston is further included.

The present invention is characterized in that: the equation D2<D1+2t1 is satisfied if the maximum outer diameter of the second port is D2, the maximum outer diameter of the one end of the tube is D1, and the thickness of the one end of the tube is t1, when the second port is connected to the one end of the tube; or the equation D4<D3+2t2 is satisfied if the maximum outer diameter of the third port is D4, the maximum outer diameter of the other end of the tube is D3, and the thickness of the other end of the tube is t2, when the third port is connected to the other end of the tube.

The present invention is characterized in that the height of the first port protrudedly formed from the upper surface of the main body is formed to be smaller than the width of the second port protrudedly formed from the one side of the main body, or the width of the third port protrudedly formed from the other side of the main body.

The present invention is characterized in that the tube is disposed in the outer side of the side portion along the circumferential direction, and the air compressing operation is accomplished through the extension and contraction movement of the side portion when the tire is rotating.

The present invention is characterized in that the tube is located between the end of the belt portion and the end of the apex.

The present invention is characterized in that: in the outer side of the side portion of the tire, a groove wherein the tube is inserted is further formed; wherein among the portions of the tube being connected to the second port, if the portion of the tube between the second port and the point where the tube is completely inserted into the groove is defined as a tube connecting portion 160, it is satisfied that the inwardly bending angle of the tube connecting portion 160 towards the tire cavity is less than 90 degrees with respect to the center of the regulator; or wherein among the portions of the tube being connected to the third port, if the portion of the tube between the third port and the point where the tube is completely inserted into the groove is defined as a tube connecting portion 170, it is satisfied that the inwardly bending angle of the tube connecting portion 170 towards the tire cavity is less than 90 degrees with respect to the center of the regulator.

The tire with self-inflation device of the present invention has advantages as follows.

(1) When compared to the prior art, in the present invention, among a plurality of ports, the second port connected with the one end of the tube, and a third port, located in the opposite side of the second port, connected with the other end of the tube, are formed in the side surface of the main body so that the overall size of the regulator can be significantly reduced.

Also, when connecting with the tube, the air flow inside the tube becomes smooth since the bending phenomenon of the flexible tube occurring at the port can be avoided.

(2) The second port is formed in the regulator, and the third port is located in the opposite side of the second port.

The one end of the tube is connected to the second port, and the other end of the tube is connected to the third port.

Such structure can reduce the degree of external exposure of the regulator significantly so that the damages to the ports formed in the regulator as well as the regulator itself can be greatly reduced.

(3) By inserting the tube inside the side portion wherein the extension and contraction movements of the tire are mostly occurring, the efficiency of the air supply to the tire cavity during driving can be enhanced further.

(4) The air compressed towards the driving direction is injected to the tire cavity, and the air from the outside is charged to the tube due to the negative pressure formed in the tube located in the opposite side of driving.

(5) Generally, it is known that the main parts vulnerable to damage are the ends of the belt and apex of the tire, therefore the present invention has a structure wherein the tube is located in a way that such parts vulnerable to damage are avoided.

Thus, the durability of the tire may not be seriously affected even if a groove for inserting the tube is formed in the side portion of the tire.

(6) The groove slightly protruded out of the side portion can be functioned as a rim protector protecting the wheel.

(7) The upper part and the lower part of the groove added to the side portion enhance the noise property of the tire and good for a comfortable ride due to the increase in damping of the side which is the major region of extension and contraction.

(8) In the present invention only the fourth port among the plurality of ports formed in the regulator is allowed to be communicating with the tire cavity.

Thus, when compared to the prior art, since the number of holes penetrating through the side portion of the tire can be reduced significantly, so the degradation in the durability of the side portion of the tire due to the formation of the holes can be minimized.

(9) Since connecting the regulator with the tube and mounting thereof to the tire can be accomplished from the outside of the tire, the assembling of the tire and the regulator becomes easy and the air pressure can be adjusted manually as well.

(10) Since the piston accommodated inside the regulator performs back-and-forth movement along the circumferential direction of the tire, the impact of centrifugal force along the radial direction according to the rotation of the tire becomes negligible.

Therefore, the durability of the piston being accommodated inside the regulator is excellent when compared to that of the prior art, and the basic role of maintaining air pressure can be faithfully practiced as well.

DETAILED DESCRIPTION OF EMBODIMENT

Hereinafter, firstly, the regulator 50 will be described as a main focus.

The tire 10 of the present invention includes a side portion.

A tube 40 is disposed in the outer side of the side portion 15.

When the tire 10 is being driven, as an extension and contraction movement is occurring in the side portion 15, accordingly, another extension and contraction movement is occurring in the tube 40 disposed in the side portion 15.

Air injection into the tire cavity 19 due to such extension and contraction movements in the side portion 15 and the tube 40 will be described later.

The above described tube 40 is connected to the regulator 50.

Figure 2:
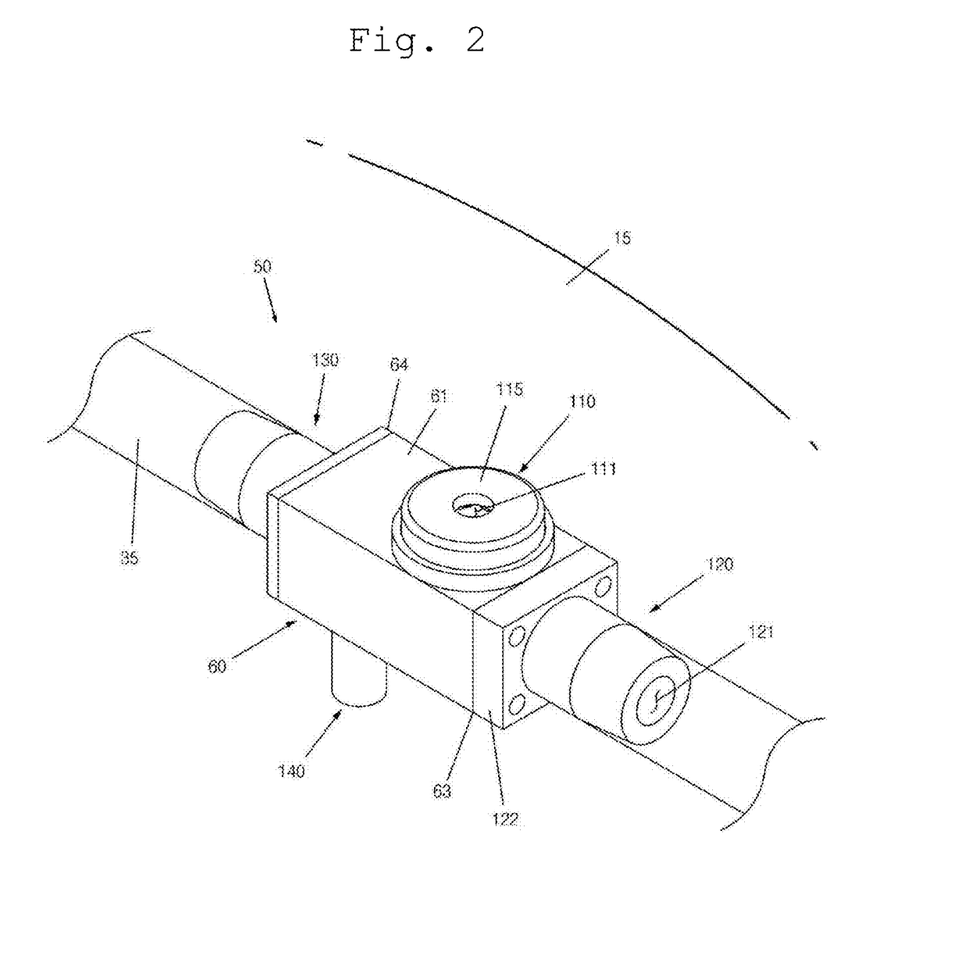
FIG. 2 is a perspective view of a regulator according to a preferred exemplary embodiment of the present invention.
Figure 3:
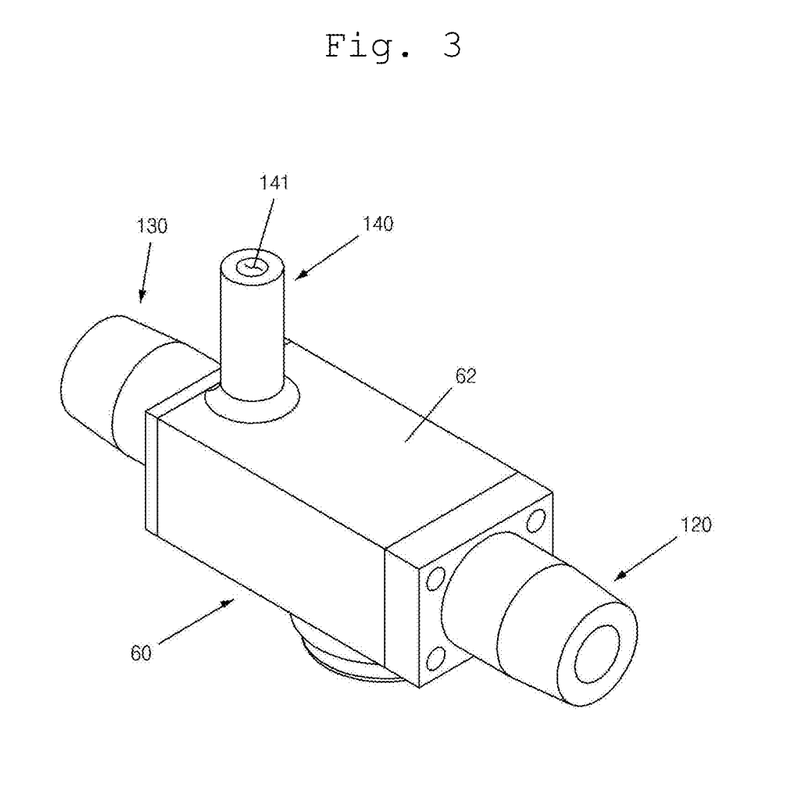
FIG. 3 is a perspective view of a regulator according to a preferred exemplary embodiment of the present invention viewing from another direction.

Hereinafter, the regulator 50 will be described with reference to FIGS. 1 to 3.

The overall shape of the regulator 50 of the present invention is like as follows.

The regulator 50 comprises a main body 60.

In the main body 60, a plurality of ports 110, 120, 130, and 140 is formed protruded from the upper side, the side surfaces, and the lower surface of the main body.

The shape of the main body 60 excluding the plurality of ports 110, 120, 130, and 140 is similar to the shape of a rectangle wherein a main body's space 65 is formed.

A piston 70 is accommodated by the main body's space 65 formed inside the main body 65.

The piston 70 adopted by the present invention performs a back-and-forth movement inside the main body's space 65 formed inside of the main body 60 along the circumferential direction of the tire.

The piston 70 comprises a piston's first portion 71 and a piston's second portion 72.

The piston's first portion 71 is formed to have a larger diameter than that of the piston's second portion 72, but instead, the length of the former is shorter than that of the piston's second portion 72.

Figure 1:
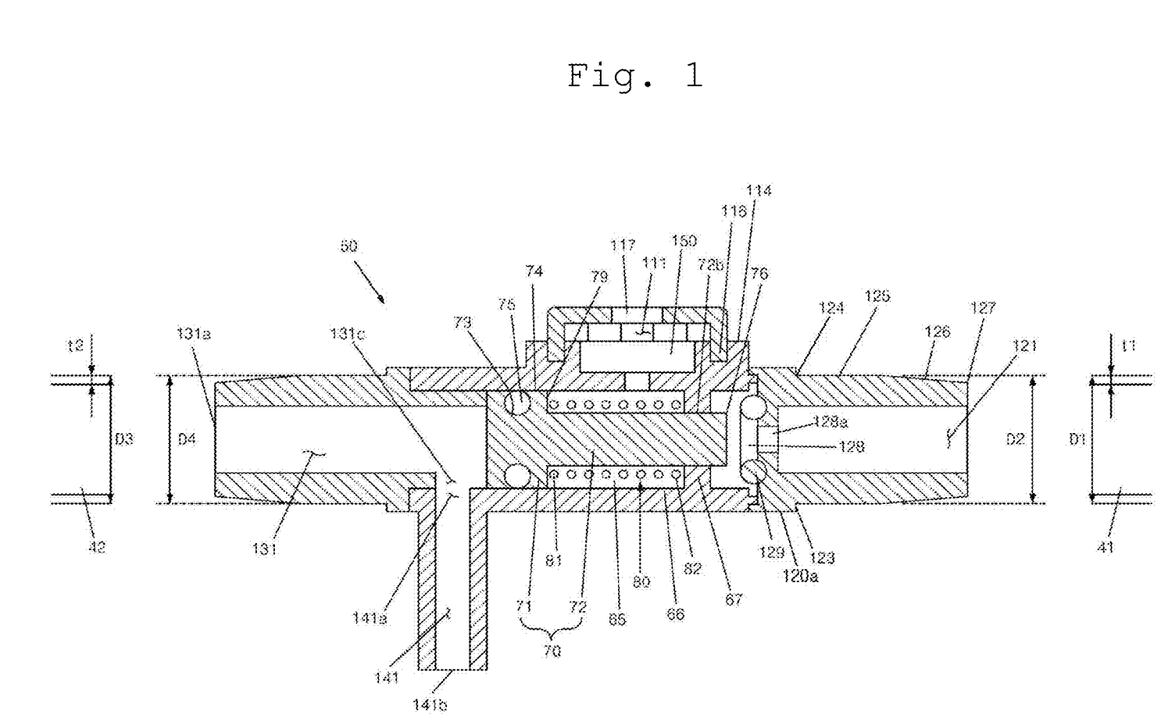
FIG. 1 is a cross-sectional view of a regulator according to a preferred exemplary embodiment of the present invention.

For reference, the one surface of the piston's first portion 71 is in contact with the one end of the third port 130 (refer to FIG. 1).

In other words, the one end of the third port 130 plays the role of a stopper of the piston 70.

A groove 73 is formed in a side surface 74 of the first portion of the piston along the circumference of the piston's first portion 71.

A first O-ring 75 is located in the groove 73 of the side surface of the first portion of the piston.

The first O-ring 75 plays the role of hermetically sealing the space between the side surface 74 of the first portion of the piston and a main body's inner surface 66 of the space inside the main body.

The piston's second portion 72 is integrally formed with the piston's first portion 71, and has a smaller outer diameter when compared to the piston's first portion 71, and the length thereof is longer than that of the piston's first portion 71.

The other side 72b of the piston's second portion is inserted into a piston supporting portion 67 having a predetermined length and formed protrudedly from the main body's inner surface 66 of the main body's space, and supported thereby.

In the piston supporting portion 67, a circular hole is formed so that the piston's second portion 72 having a circular cross-section can be movable along the lateral direction.

More specifically, a portion of the piston's second portion 72 is positioned protruded a predetermined length from the piston supporting portion 67 when viewed with reference to the cross-sectional view of FIG. 1, but the other end 76 of the piston's second portion is positioned spaced apart from a second port's valve hole 128a.

Within the piston's second portion 72, a spring 80 is inserted in the remaining portion of the piston's second portion 72 except the other side 72b of the second portion of the piston which is inserted into the piston supporting portion 67 and supported thereby.

A gap is formed between the piston supporting portion 67 and the other side 72b of the second portion of the piston so as to allow the lateral movement of the piston 70.

More specifically, spring's one end 81 is in contact with the step between the piston's first and the second portions 79, and supported thereby.

Meanwhile the spring's other end 82 is in contact with one surface of the piston supporting portion 67 and supported thereby.

Hereinafter, a plurality of ports 110, 120, 130, and 140 will be described.

The first port 110, having a predetermined height, is formed protrudedly on the main body's upper surface 61 in a shape similar to a cylinder.

As the first port 110 plays the role of communicating with the outside air, a certain degree of protrusion at the side portion 15 cannot be avoided, and the risk of damages of the externally exposed first port 110 is higher than that of the other ports, for example, the second port 120 and the third port 130 that are connected to the tube 40 and that are accommodated by a groove 35.

Therefore, the height of protruded portion of the first port 110 from the main body's upper surface 61 is formed to be smaller than the width of the second port 120 protrudedly formed from the main body's one side 63.

In this way, the degree of exposure of the first port 110 towards the outside can be reduced.

The first port 110 includes a cover 115.

The cover 115 has been formed removable from a cover supporting portion 114 which is protrudedly formed to have a predetermined height.

The cover supporting portion 114 is formed to have a larger diameter than that of the cover 115.

That is, the cover's lower end 116 is inserted into the groove (not shown) formed in the cover supporting portion 114, thereby forming a structure wherein the cover 115 is fixed to the main body 60 and supported thereby.

Meanwhile, a check valve 150 is located in the lower side of the cover 115.

The check valve 150 may further be formed in order to prevent the air, introduced into the main body's space 65 through a first pathway 111 which will be described later, from reverse flowing towards the outside through the first pathway 111 again.

More specifically, the check valve 150 is interposed between the spring 80 and the first port 110, and communicating with the first pathway 111.

For reference, a filter (not shown) may further be located between the check valve 150 and the lower portion of the cover 115.

The filter (not shown) plays the role of preventing foreign substances, which may be included in the air introduced through the first pathway 111 via the first port 110, from infiltrating into the inside of the regulator 50.

The first pathway 111 formed in the first port 110 and communicating with the check valve 150 is communicating with the main body's space 65.

In the exemplary embodiment of the present invention, the first pathway 111 is communicating with a through-hole 117 formed in the center of the cover 115, and also comprised of a straight line pathway communicating with the main body's space 65.

Since the first port 110 is communication with the outside air, eventually, the main body's space 65 can be communicating with the outside air via the first pathway 111.

Hereinafter, the second port 120 located in the main body's one side 63 will be described.

The second port 120 is protrudedly formed to have a predetermined width from the main body's one side 63.

More specifically, the shape of the second port 120 can be described as follows.

First, second port's one end 124 is protrudedly formed to have a predetermined width from the main body's one side 63, and integrally formed with the second port's other end 127.

The outer diameter of the second port's other end 127 is formed to be smaller than that of the second port's one end 124.

For reference, a second port connecting portion 122 is interposed between the main body's one side 63 and the second port 120.

Referring to the cross-section of FIG. 1 as a reference, it is integrally formed in the order of the second port connecting portion 122, a step 123 between the second port connecting portion and the one end of the second port, the second port's one end 124, a second port's horizontal portion 125, a second port's inclined portion 126, and the second port's other end 127 towards the outer direction.

The maximum value of the outer diameter of the second port 120 is same as that of the second port's one end 124 or the second port's horizontal portion 125.

The outer diameter of the second port 120 is gradually decreasing as it passes the second port's horizontal portion 125 and passing through the second port's inclined portion 126.

The second port's other end 127 has the minimum value of the outer diameter of the second port 120.

The reason why the second port's other end 127 has the minimum outer diameter of the second port 120 is to facilitate the connection with a tube 40, more specifically with tube's one end 41.

In other words, the second port's other end 127 formed to have the smallest value of the outer diameter of the second port 120 and the second port's inclined portion 126 play the role of connecting the second port 120 to a flexible tube smoothly as the tube's one end 41 is expanding.

Referring to the cross-section of FIG. 1 as a reference, the difference between the height of a second port connecting portion 120a and the outer diameter of the second port's one end 124 forms a step 123 between the second port connecting portion and the one end of the second port.

It is preferred that the tube's one end 41 connected to the second port 120 is located and in contact with the step 123 between the second port connecting portion and the one end of the second port.

Meanwhile, a second pathway 121 of the second port 120 is formed penetrating the second port 120.

A second port's valve 128 is formed between the second pathway 121 and the above mentioned other end 76 of the second portion of the piston.

The second port's valve 128 comprises a second O-ring 129 and a second port's valve hole 128a.

The second O-ring 129 is located in the side surface of the second port connecting portion 122.

That is, the second O-ring 129 is located between the other end 76 of the second portion of the piston and the side surface of the second port connecting portion 122.

Meanwhile, referring to FIG. 1 as a reference, the second port's valve hole 128a is formed in the right side of the second O-ring 129.

The second port's valve hole 128a is formed penetrating the second port connecting portion 122 along the lateral direction so as to be communicating with the second pathway 121.

Hereinafter, the third port 130 formed in the main body's other side 64 will be described.

Referring to FIG. 1 as a reference, since the shape of the third port 130 is same as the second port 120 previously described, the detailed description thereof will be omitted.

The outer diameter of the other end 137 of the third port 130 is formed to be smaller than that of the one end (not shown) of the third port.

The third port 130 is protrudedly formed to have a predetermined width from the main body's other side 64, and located there to.

A third pathway 131 formed in the third port 130 is formed penetrating through the third port 130.

Tube's other end 42 is connected to the third port 130.

More specifically, we may consider that the tube's other end 42 is connected to the inlet 131*a* of the third pathway.

Meanwhile, a second outlet 131*c* is formed in the third pathway 131.

That is, a portion of the lower side of the third pathway 131 is cut off and a second outlet 131*c* is formed thereby.

A fourth pathway 141 which will be described later and the third pathway 131 are communicating with each other through the second outlet 131*c* of the third pathway. Hereinafter, the fourth port 140 wherein the fourth pathway 141 is formed will be described.

The fourth pathway 140 is formed from a main body's lower surface 62.

Similar to the above described ports 110, 120, and 130, the fourth port 140 is protrudedly formed to have a predetermined height (width).

The fourth pathway 141 is formed vertically penetrating the fourth port 140.

More specifically, a fourth pathway's inlet 141*a* is communicating with the second outlet 131*c* of the third pathway previously described.

Therefore, the air supplied from the tube's other end 42 can be introduced into the fourth pathway 141 via the fourth pathway's inlet 141*a* passing through the third pathway 131.

The air introduced through the fourth pathway 141 can be injected to the tire cavity 19 through an outlet 141*b* of the fourth pathway.

Meanwhile, when the air passed through the third pathway 131 is entering into the fourth pathway 141 the flow direction of the air is switched 90 degrees.

The air whose flow direction is switched 90 degrees is injected into the tire cavity 19 from the fourth pathway 141.

The diameter of the fourth port 140 is formed to be smaller than the diameter of the second port 120 where the tube 40 is connected to, or the third port 130, so that the impact to the durability of the side portion 15 can be minimized as possible when the fourth port 140 is penetrating the side portion 15.

In this way, in the present invention, the injection of the air into the tire cavity 19 is performed by using only one port, that is, the fourth port 140, among the plurality of ports 110, 120, 130, and 140 formed in the regulator 50.

When compared to the prior art, this structure significantly reduces the number of through-holes formed for the communication between the ports and the side portion 15.

Thus, there are advantages that the productivity can be enhanced due to the reduction of the number of processes, and also the degradation in the durability of the side portion of the tire caused by forming through-holes can be minimized.

Meanwhile, a groove 35 is formed along the circumferential direction of the tire 10, and the tube 40 is inserted in to the groove 35.

Specifically, the groove 35 is formed in the outer side 15*a* of the side portion 15.

It is preferred that the length of the circumference of the groove 35 is formed to be slightly shorter than the circumference of the side portion 15, more specifically the length is to be reduced by the length of the regulator 50.

As described above, the tube's one end 41 is connected to the second port 120 of the regulator 50, and the tube's other end 42 is connected to the third port 130.

In the present invention, when the regulator 50 is coupled to the side portion 15 of the tire, the second port 120 where the tube's one end 41 is connected to, or the third port 130 where the tube's other end 42 is connected to may be accommodated by the groove 35.

Therefore, while driving a vehicle, the damages to the port connected to the tube 40 by the external impact can be significantly reduced.

Such effect can be accomplished by miniaturizing the sizes of the second port 120 and the third port 130 compared to the prior art.

Meanwhile, when the tube 40 is being connected to the port, it is preferred that the following requirements are satisfied in order to accommodate the second port 120 or the third port 130 into the groove 35.

When the second port 120 is connected to the tube's one end 41, the maximum value of the outer diameter of the second port 120 is defined as D2.

Meanwhile, the maximum outer diameter of the tube's one end 41 is defined as D1, and the thickness of the tube's one end 41 is defined as t1.

At this time, it is preferred to satisfy the requirement that the maximum value D2 of the outer diameter of the second port 120 is smaller than the value wherein two times of the thickness t1 of the tube's one end 41 is added to the maximum value D1 of the outer diameter of the tube's one end 41.

When this requirement is satisfied, after the tube 40 is connected to the second port 120, the tube's one end 41 can have similar height of the second port 120.

This arrangement can prevent the excessive protrusion from the groove 35 when the tube 40 and the second port 120 are connected.

Similarly, when the third port 130 is connected to the tube's other end 42, the maximum value of the outer diameter of the third port 130 is defined as D4.

The maximum outer diameter of the tube's other end 42 is defined as D3, and the thickness of the tube's other end 42 is defined as t2.

At this time, it is preferred to satisfy the requirement that the maximum value D4 of the outer diameter of the third port is smaller than the value wherein two times of the thickness t2 of the tube's other end 42 is added to the maximum value D3 of the outer diameter of the tube's other end 42.

Hereinafter, the operation principle of a regulator 50 in a tire with self-inflation device of the present invention will be described.

First, air is introduced into the main body's space 65 through the first port 110 communicating with the outside air.

The air introduced into the main body's space 65 is moved to the tube 40 through the second pathway 121 of the second port 120 via the second port's valve hole 128*a*.

The air introduced into the tube 40 is moving along the tube 40, and moved to the third pathway 131 passing through the tube's other end 42.

The air moved to the third port 130 is moved to the fourth pathway 141 of the fourth port 140 through the fourth pathway's inlet 141a communicating with the second outlet 131c of the third pathway.

The fourth port 140 is penetrating through the side portion 15, and communicating with the tire cavity 19, therefore, the air moved to the fourth pathway 141 of the fourth port 140 can be supplied to the tire cavity 19.

Meanwhile, in the present invention, the second port's valve 128 opens only when the air pressure inside the tire cavity 19 is lower than the preset air pressure.

When the regulator 50 is not operating, as previously described, the tensile strength of the spring 80 of the tire reacts in a way that it pushes the piston 70 towards the third port 130.

Thus, the piston 70 is located spaced apart from the second port's valve hole 128a.

That is, the second port's valve hole 128a is opened without being blocked by the piston 70.

Therefore, the air introduced into the main body's space 65 via the first port 110 can be moved to the tube 40 through the second port 120.

The movement of the air introduced into the main body's space 65 towards the third port 130 or the fourth port 140 is blocked by the first O-ring 75.

Eventually, the air introduced into the main body's space 65 via the first port 110 must have a pathway wherein the air is moved via the second port 120, via the tube 40, via the third port 130, and towards the fourth port 140.

If the air pressure inside the tire cavity 19 is equal to or greater than the preset air pressure, the regulator 50 blocks the air injection into the tire cavity 19.

The air inside the tire cavity 19 is pushing the piston 70 through the fourth port 140 which is communicating with the air.

The air inside the tire cavity 19 is pushing the first portion 71 of the piston towards the right side with respect to FIG. 1 via the fourth port 140 which is communicating with the air.

The piston 70 being pushed towards the right side is being moved towards the direction of the second port 120 overcoming the tensile strength of the spring 80.

Therefore, the piston 70 being pushed towards the direction of the second port 120 blocks the second port's valve 128, more specifically, the second port's valve hole 128a.

When the second port's valve hole 128a is blocked by the piston 70, the outside air cannot be introduced through the first port 110 even if a negative pressure is generated inside the tube 40 due to the rotation of the tire, therefore the cannot be charged into the tire cavity 19.

The structure of a tire 10 adopting the aforementioned regulator 50 in a tire with self-inflation device of the present invention will be described as follows.

Figure 5:
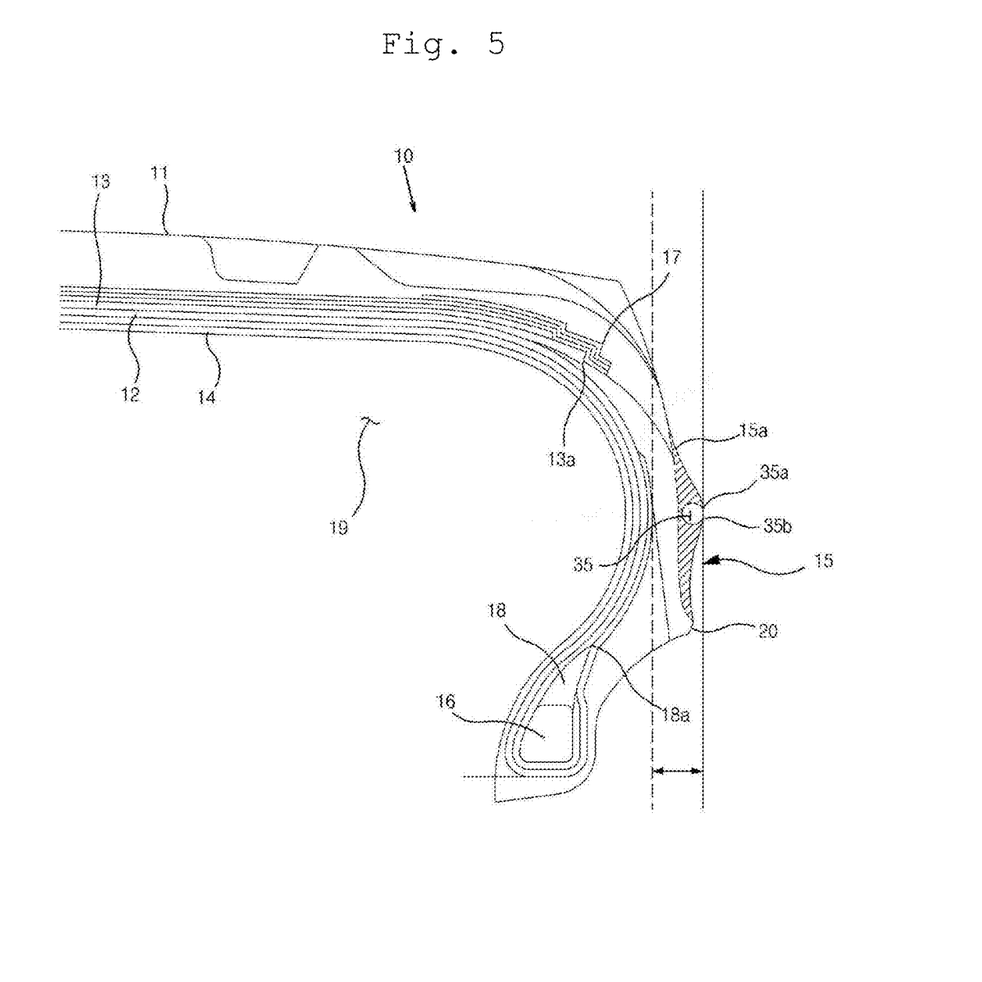
FIG. 5 is a cross-sectional view of a tire with self-inflation device according to a preferred exemplary embodiment of the present invention.
Figure 11:
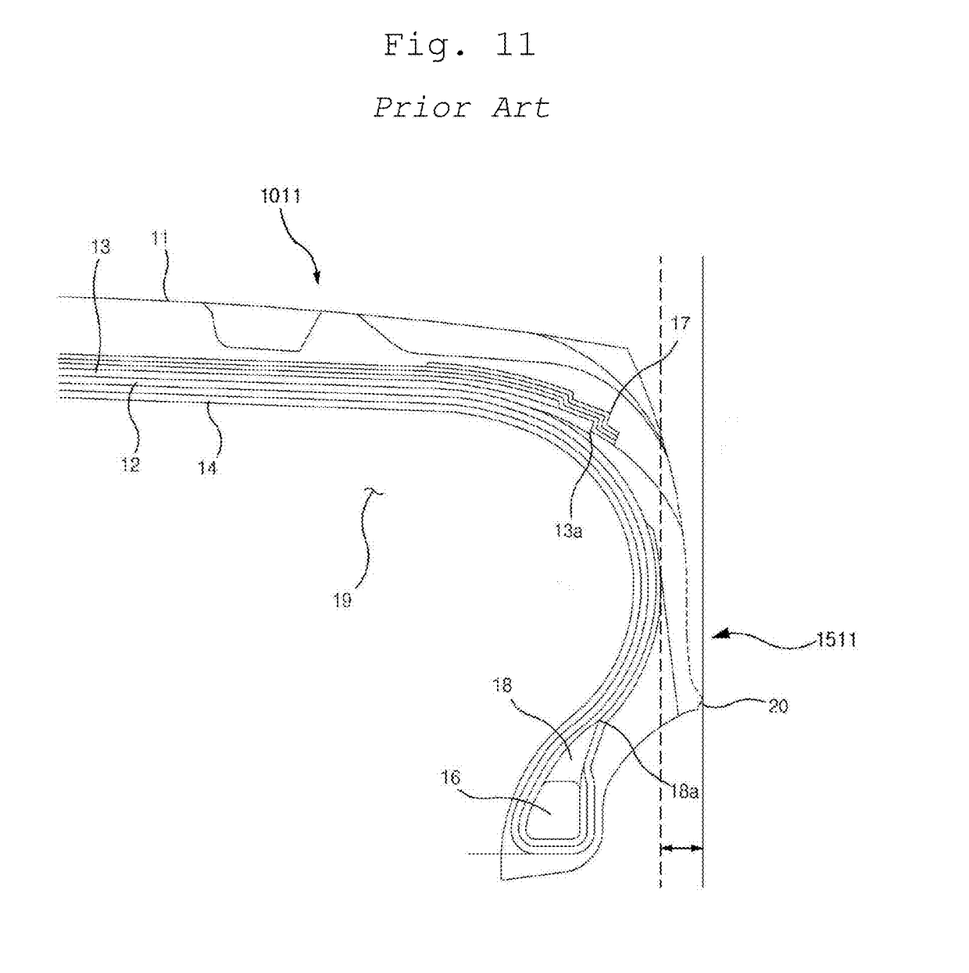
FIG. 11 is a cross-sectional view of a tire of the prior art.

FIG. 5 illustrates a cross-sectional view of the tire 10 of the present invention wherein the side portion 15 is reinforced, and for reference, FIG. 11 illustrates a cross-sectional view of the tire 1011 of the prior art wherein the side portion 1511 is not reinforced.

The terms used in the description hereinafter will be defined as follows.

A tread portion 11 means a portion of a tire 10 which directly contacts the ground and forming a ground contact surface.

A body ply 12 forming the frame of the tire 10 is located in the lower side of the tread portion 11.

The body ply 12 is a portion forming the skeleton of the tire 10 enduring the air pressure, weight, and impact inside of the tire and also called as a carcass.

Since the tensile strength is reacting on the body ply 12 from the all directions, cords made of mainly nylon, polyester, rayon, and the like are provided in order to maintain such tensile strength.

A tire cord fabric is formed by arranging a plurality of fabric cords with a predetermined gap and coating thereof with a thin rubber sheet along the up-down direction.

A belt portion 13 made by stacking a plurality of belt layers is located between the tread portion 11 and the body ply 12.

A cap ply 17 is located at an end 13a of the belt portion.

The cap ply 17 has a structure which covers the end 13a of the belt portion, and plays the role of preventing the delamination and separation of the belt having a multi-layered structure.

Meanwhile, an inner liner 14 which prevents the leaking of the air is located inner side of the body ply 12.

Meanwhile, a side portion 15, which protects the body ply 12 forming the skeleton of the tire 10 and allows a flexible contraction and expansion movement, is located in the side surface of the tire 10.

Such side portion 15 connects the tread portion 11 and a bead portion 16.

The bead portion 16 means a portion for mounting the tire 10 to the rim.

The tire cavity 19 means a space formed by the inner surface of the tread portion 11, the inner surface of the side portion 15, and the outer surface of the rim (not shown).

Meanwhile, an extension and contraction movement of a tire in the present invention means an up-down movement wherein the tire 10 is folded at the ground contact surface due to the contact with the ground and then unfolded again.

The tire 10 is mounted to the rim (not shown), and the assembling of the rim and the tire 10 is accomplished by the bead portion 16.

During driving, since the bead portion 16 is the portion receiving much impact from the rim (not shown), an apex 18 surrounding the bead portion 16 is formed for alleviating the impact being received by the bead portion 16.

Meanwhile, a rim protector 20, a portion which is coupled to the rim (not shown), is located close to the rim (not shown), therefore the high temperature heat generated during driving or from the disk brake is transferred thereto, so that it requires a superior heat resistance so that the change in the tensile strength and hardness of the rubber due to the heat is minimized, and it plays the role of reducing the damage, scratches, and the like to the rim caused by an external physical impact.

It is preferred that the tube 40 in a tire with self-inflation device is located as described as follows.

In a tire with self-inflation device, the tube 40 is located in the outer side 15a of the side portion 15 wherein extension and contraction of the tire is mostly occurring during driving.

When specifically explained, the tube 40 is located in the opposite side of the cavity 19 which is a space formed by the inner surface of the tread portion 11, the inner surface of the side portion 15, and the outer surface of the rim.

Figure 7:
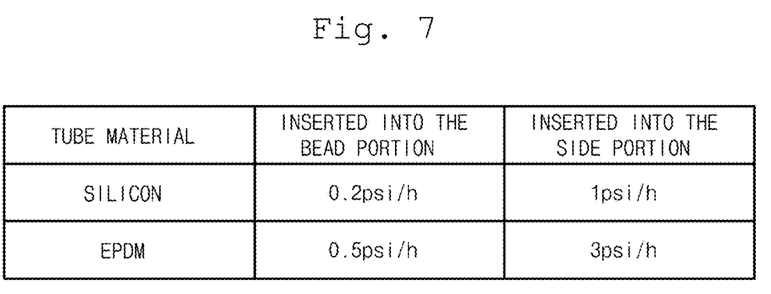
FIG. 7 is a comparison diagram of the increase in the air pressure depending on the position of the tube.
Figure 8:
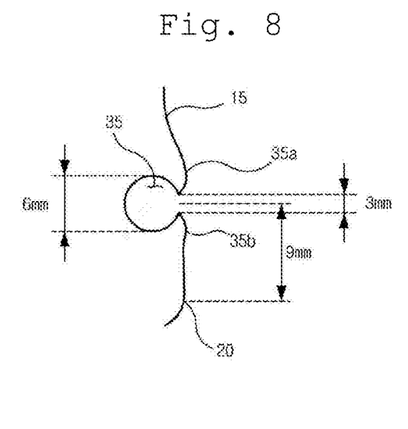
FIGS. 8 and 9 are the partially exploded cross-sectional views of FIG. 5.
Figure 9:
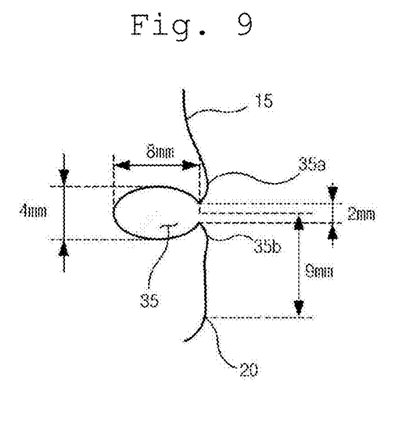

FIG. 7 compares the performance of air pressure increase depending on the location of the tube 40, and shows that it is advantageous in air pressure increase when the tube is located in the side portion 15.

That is, it is shown that the performance of air injection into the tire cavity 19 is superior when the tube 40 is located in the side portion 15, more specifically, in the outer side 15a of the side portion 15 than when the tube 40 is located in the bead portion 16, regardless of the tube material.

Meanwhile, the thickness of the side portion 15 needs to be increased in order to prevent the degradation in the durability due to the groove 35 wherein the tube 40 is inserted.

In this way, when the thickness of the side portion 15 is increased, not only the noise property of the tire is enhanced due to the increase in damping of the side portion 15, but also the comfortable feeling of the vehicle riding is also enhanced thereby.

Figure 10:
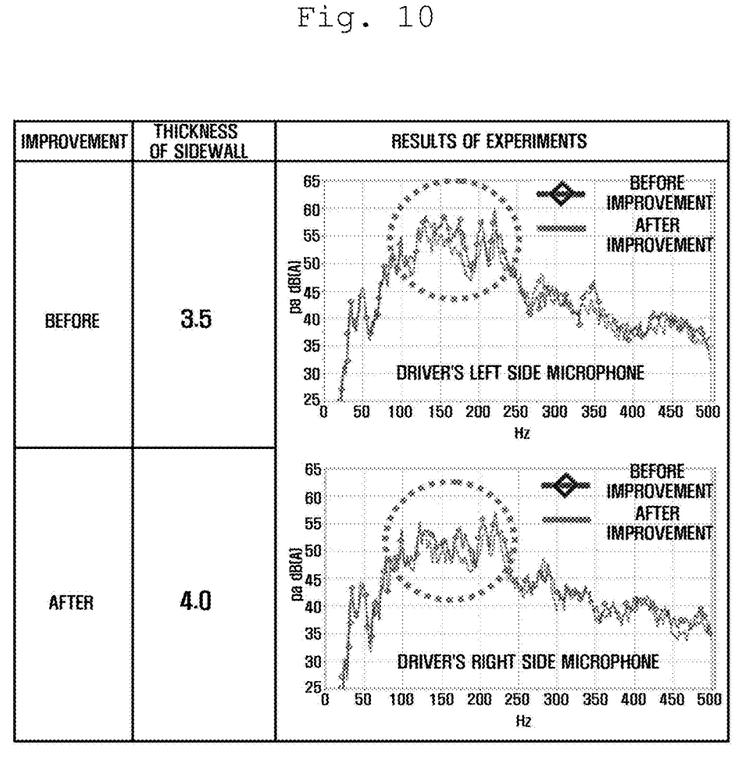
FIG. 10 is a comparison diagram of the noise performance depending on the increase in the thickness of the side portion.

FIG. 10 shows the result of experiments wherein the noise property is enhanced due to the increase in the thickness of the side portion 15, and it is shown that the noise in the booming region is reduced about 2 dB due to the increase in damping of the side portion 15.

Meanwhile, the groove 35, formed in the outer side 15a of the side portion 15 in order to insert a tube 40 in the side portion 15, also performs actions as follows.

(1) The groove 35 slightly protruded towards the outer side 15a of the side portion 15 may play the role of a protector protecting the wheel (not shown).

(2) An upper portion 35a and the lower portion 35b of the groove 35 which is formed to insert a tube 40 into the outer side 15a of the side portion 15 are protruded towards the outer side 15a of the side portion 15 when compared to the prior art, and thus, the noise property of the tire is enhanced due to the increase in damping of the side portion 15 which is a major area of extension and contraction, and it is also acts advantageously for a comfortable ride.

The tire with self-inflation device of the present invention includes a tube 40 for compressing air through the extension and contraction movement of the side portion 15 during the tire rotation, and also may further include the regulator 50 which will be described later.

The tube 40 disposed in the outer side 15a of the side portion 15 along the circumferential direction compresses air through the extension and contraction movement of the side portion 15 when the tire is rotating.

According to the extension and contraction movement of the side portion 15, a force is applied towards the radial direction of the tube 40.

Figure 4:
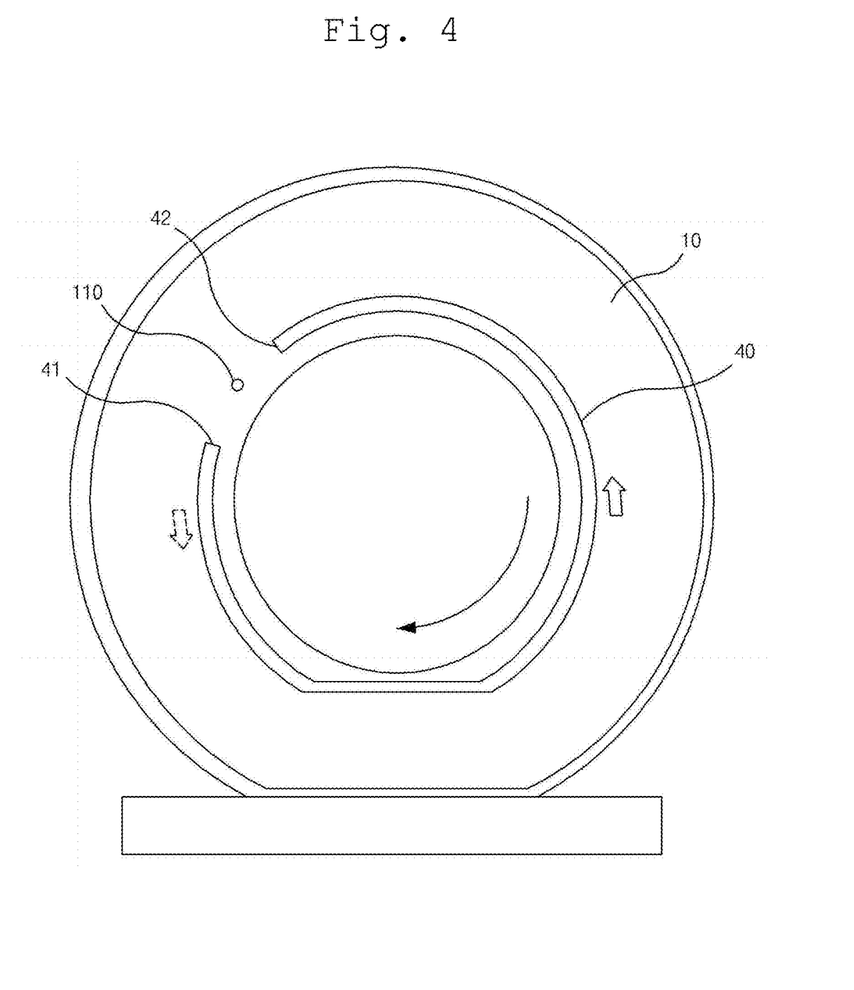
FIG. 4 is a conceptual block diagram of a tire with self-inflation device according to a preferred exemplary embodiment of the present invention.

When the tire 10 is driving while in contact with the road surface, the air inside the tube 40 is being compressed (refer to the arrow drawn in a continuous line in FIG. 4).

Meanwhile, when the tire 10 is driving while in contact with the road surface, a negative pressure is generated inside the tube 40 located in the opposite side of driving direction due to an instant vacuum, and thus, an outside air is introduced into the tube 40.

Meanwhile, in a preferred exemplary embodiment, a groove 35 wherein a tube 40 is inserted along the circumferential direction of the tire 10 is formed in the outer side 15a of the side portion 15.

More specifically, the groove 35 is formed by cutting out a portion of the outer side 15a of the side portion.

It is preferred that the length of the circumference of the groove 35 formed in the side portion 15 is shorter than the circumference of the side portion 15, and this is for mounting of a regulator 50 which will be described later.

The groove 35 formed in the side portion 15 will be specifically described with reference to the cross-sectional view of FIG. 5 as follows.

It is preferred that the tube 40 is located between the end 13a of the belt portion and an end 18a of the apex.

For reference, the apex 18 means a portion which surrounds the bead portion 16 and alleviates the impact to be received by the bead portion 16, and generally the end 18a of the apex 18 and the end 13a of the belt are considered as main portions of a tire vulnerable to damages.

Meanwhile, the apex 18 is encompassed by the body ply 12 which protects the bead portion 16 and supports the side portion 15 of the tire, and has a high stiffness characteristic among the rubber materials.

That is, similarly, the end 18a of the apex 18 also becomes an area vulnerable to damage as the heat is concentrated thereon because the movement of the end 18a of the apex is converted into the heat energy due to the dissimilar material bonding with the body ply 12 and the characteristics of high stiffness material.

Thus, in the present invention, the tube 40 is located between the end 13a of the belt portion and the apex 18 avoiding the major areas vulnerable to damage (that is, the end 18a of the apex and the end 13a of the belt portion) in order to obtain the durability of the tire 10.

In the present invention, the experiment was performed by inserting the tube 40 between the end 18a of the apex and the end 13a of the belt portion with reference to the experiment tire (265/35R20) as an area most active in compression and expansion of the tire 40, and wherein the major areas of the tire vulnerable to damage are avoided.

When the groove 35 wherein the tube 40 is inserted is formed according to the present invention, the thickness increase in the entire or a portion of the side portion 15 is necessary in order to prevent the degradation in the durability of the side portion 15 due to the formation of the groove 35.

Accordingly, there are two types of configurations in the present invention as follows.

(1) The diameter of the groove 35 is formed to be 6 mm, and the inlet of the groove 35 formed with an opening is formed to be 3 mm.

The location of the groove 35 is determined to have a distance of 9 mm from the rim protector 20 to the center of the groove 35.

In the case of the present invention, the upper portion 35a and the lower portion 35b of the groove 35 are further protruded towards the outer side 15a of the side portion 15 than the rim protector 20 which is considered as the outmost portion of a tire of the prior art.

At this time, the thickness of the side portion 15 is increased by 6 mm from the thickness of the prior art.

(2) The depth of the groove 35 is formed to be 8 mm, and at this time, the height of the groove 35 is formed to be 4 mm, and the inlet of the groove 35 wherein an opening is formed is formed to be 2 mm.

At this time, the thickness of the side portion 15 is increased by 8 mm from the thickness of the prior art.

Specifically, the groove 35 is located between the end 18a of apex and the end 13a of the belt portion.

In addition, the groove 35 has a depth corresponding to a value from 50% (min.) to 90% (max.) of the remaining section (distance illustrated by the arrow in FIG. 5) excluding the thickness including the body ply 12 from the outmost portion of the tire which is on the same line as the inner portion of the tire.

In here, the outmost portion of the tire means the upper portion 35a of the groove 35 and the lower portion 35b of the groove 35 protruded towards the outer side 15a of the side portion 15 when compared to the prior art.

As the exemplary embodiment of the present invention, when the depth of the groove 35 is formed to be greater than 50% of the remaining section (distance illustrated by the arrow in FIG. 5) excluding the thickness (dotted line in FIG. 5) including the body ply 12 from the outmost portion of the tire which is on the same line as the inner portion of the tire, it will not affect the compression property of the tube 40 since the center point of the tube 40 is not deviating off from the outer periphery of the tire.

In addition, when the depth of the groove 35 is formed to be maximum 90% of the remaining section (distance illustrated by the arrow in FIG. 5) excluding the thickness (dotted line in FIG. 5) including the body ply 12 from the outmost portion of the tire which is on the same line as the inner portion of the tire, tire damages due to the exposure of the cords can be prevented.

For the compression performance of the tube 40, the center point of the tube 40 should be inwardly located from the tangential line drawn at the outmost portion of the tire (continuous line in FIG. 5).

In the exemplary embodiment of the present invention, the section (distance illustrated by the arrow in FIG. 5) wherein the groove 35 may possibly formed is the region between the continuous line and the dotted line in the FIG. 5

Meanwhile, in the case of FIG. 11 illustrating a cross-section of a tire of the prior art, the outmost portion of the tire becomes the rim protector 20.

Therefore, the section (distance illustrated by the arrow in FIG. 11) wherein the groove 35 may possibly formed is the region between the continuous line in FIG. 11 which is the tangential line at the rim protector 20 and the dotted line which is the tangential line of the outmost portion of the body ply 12.

It can be seen that when the side portion 15 is not reinforced, the section wherein the groove 35 may possibly formed is formed narrower than that of the present invention.

Meanwhile, when connecting the tube 40 and the regulator 50, it is necessary to avoid the stacking point which is a flow bottleneck interfering the air flow inside the tube 40.

When a stacking point which is a flow bottleneck is occurring, the air cannot be smoothly supplied into the tire cavity 19 through the extension and contraction movement of the tube 40.

In the present invention, an exemplary embodiment for preventing or reducing the stacking point phenomenon, which is a flow bottleneck, is suggested as follows.

As previously described, a groove 35 wherein a tube 40 is inserted is further formed in an outer side of the side portion 15 of a tire 10.

Tube's one end 41 is connected to a second port 120.

At this time, among the tube 40 whose one end 41 is connected to the portions of the second port 120 the portion between the second port 120 and the point where the tube 40 is starting to be inserted into the groove 35 is defined as a tube connecting portion 160.

Specifically, the tube connecting portion 160 could mean the portion between the second port's other end 127 and the tube 40 inserted into the groove 35 within the tube 40.

Figure 6:
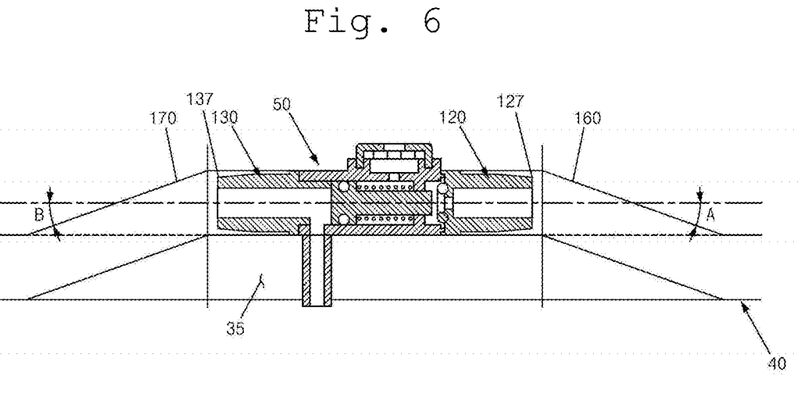
FIG. 6 is a cross-sectional view illustrating the coupling of the regulator with the tube according to a preferred exemplary embodiment of the present invention.

The inwardly bending angle A of the tube connecting portion 160 towards the tire cavity 19 in order to prevent the stacking point phenomenon should be less than 90 degrees with respect to the center of the regulator 50 (dot-and-dash line in FIG. 6).

Same goes to the third port 130.

That is, the tube's other end 42 is connected to a third port 130.

At this time, among the tube 40 whose other end 42 is connected to the portions of the third port 130 the portion between the third port 130 and the point where the tube 40 is starting to be inserted into the groove 35 is defined as a tube connecting portion 170.

Specifically, the tube connecting portion 170 could mean the portion between the other end 137 of the third port and the tube 40 inserted into the groove 35 among the portions of the tube 40.

The inwardly bending angle B of the tube connecting portion 170 towards the tire cavity 19 in order to prevent the stacking point phenomenon should be less than 90 degrees with respect to the center of the regulator 50 (dot-and-dash line in FIG. 6).

A person who has common knowledge in this technical field shall understand that the present invention may be embodied in various modified forms without departing from the fundamental characteristics of the present invention.

The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

In addition, various exemplary embodiments disclosed in the present invention may be implemented through a variety of combinations thereof.

INDUSTRIAL APPLICABILITY

According to a tire with self-inflation device of the present invention, (1) the air leaking as the time elapses during operation can be supplemented without driver's intervention, and (2) the outside air introduced through the regulator can be smoothly guided into the tire cavity via the tube.

What is claimed is:

1. A tire with self-inflation device comprising:
a side portion;
a tube disposed in an outer side of the side portion; and
a regulator connected to the tube,
wherein the regulator comprises:
a piston;
a main body having a space for accommodating the piston therein;
a first port formed in an upper side of the main body and communicating with an external air;
a second port located at one side of the main body;
a third port located at the other side of the main body; and
a fourth port communicating with the third port and formed in a lower side of the main body, and
wherein one end of the tube is connected to the second port, and the other end of the tube is connected to the third port, and the fourth port is penetrating through the side portion and being communicated with a tire cavity.

2. The tire with self-inflation device according to claim 1, wherein the piston moves back-and-forth along a circumferential direction of the tire.

3. The tire with self-inflation device according to claim 2, wherein a check valve is interposed between the first port and the piston.

4. The tire with self-inflation device according to claim 1, wherein a check valve is interposed between the first port and the piston.

5. The tire with self-inflation device according to claim 1, wherein an equation D2<D1+2t1 is satisfied if a maximum outer diameter of the second port is D2, a maximum outer diameter of the one end of the tube is D1, and a thickness of the one end of the tube is t1, when the second port is connected to the one end of the tube; or wherein an equation D4<D3+2t2 is satisfied if a maximum outer diameter of the third port is D4, a maximum outer diameter of the other end of the tube is D3, and a thickness of the other end of the tube is t2, when the third port is connected to the other end of the tube.

6. The tire with self-inflation device according to claim 1, wherein a height of the first port protrudedly formed from an upper surface of the main body is formed to be smaller than a width of the second port protrudedly formed from the one side of the main body, or a width of the third port protrudedly formed from the other side of the main body.

7. The tire with self-inflation device according to claim 1, wherein the tube is disposed in the outer side of the side portion along a circumferential direction thereof, and an air compressing operation is accomplished through an extension and contraction movement of the side portion when the tire is rotating.

8. The tire with self-inflation device according to claim 1, wherein the tube is located between an end of a belt portion and an end of an apex.

9. The tire with self-inflation device according to claim 1, wherein a groove wherein the tube is inserted is further formed in the outer side of the side portion of the tire;

wherein among portions of the tube being connected to the second port, if a portion of the tube between the second port and a point where the tube is completely inserted into the groove is defined as a first tube connecting portion, an inwardly bending angle of the first tube connecting portion towards the tire cavity is less than 90 degrees with respect to a center of the regulator; or wherein among portions of the tube being connected to the third port, if a portion of the tube between the third port and a point where the tube is completely inserted into the groove is defined as a second tube connecting portion, an inwardly bending angle of the second tube connecting portion towards the tire cavity is less than 90 degrees with respect to a center of the regulator.

* * * * *